(12) United States Patent
Munaoka et al.

(10) Patent No.: US 12,394,824 B2
(45) Date of Patent: Aug. 19, 2025

(54) SECONDARY BATTERY

(71) Applicant: MURATA MANUFACTURING CO., LTD., Kyoto (JP)

(72) Inventors: Takatoshi Munaoka, Kyoto (JP); Shinichi Katayama, Kyoto (JP); Atsushi Ouki, Kyoto (JP); Masaki Kuratsuka, Kyoto (JP); Takashige Fujikawa, Kyoto (JP); Yousuke Shima, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 496 days.

(21) Appl. No.: 18/090,947

(22) Filed: Dec. 29, 2022

(65) Prior Publication Data

US 2023/0137208 A1   May 4, 2023

Related U.S. Application Data

(63) Continuation of application No. PCT/JP2021/033476, filed on Sep. 13, 2021.

(30) Foreign Application Priority Data

Sep. 17, 2020   (JP) .................................. 2020-156447

(51) Int. Cl.
   *H01M 10/0569*   (2010.01)
   *H01M 4/485*   (2010.01)
   (Continued)

(52) U.S. Cl.
   CPC ....... *H01M 10/0569* (2013.01); *H01M 4/485* (2013.01); *H01M 4/525* (2013.01); *H01M 10/0525* (2013.01); *H01M 2300/0028* (2013.01)

(58) Field of Classification Search
   CPC ............................................ H01M 10/05–0569
   See application file for complete search history.

(56) References Cited

U.S. PATENT DOCUMENTS

2006/0286457 A1   12/2006   Sasaki
2014/0058598 A1*   2/2014   Matsui .................. H01M 4/505
                                                                429/223

(Continued)

FOREIGN PATENT DOCUMENTS

WO   2005036680 A1   4/2005

OTHER PUBLICATIONS

International Search Report of corresponding PCT application PCT/JP2021/033476, dated May 11, 2021.

*Primary Examiner* — Jonathan G Leong
(74) *Attorney, Agent, or Firm* — K&L Gates LLP

(57) ABSTRACT

A secondary battery includes a positive electrode, a negative electrode, and an electrolytic solution. The positive electrode includes a lithium-nickel composite oxide. The negative electrode includes a lithium-titanium composite oxide. The electrolytic solution includes a carboxylic acid ester. The carboxylic acid ester includes at least one of ethyl acetate, propyl acetate, ethyl propionate, or propyl propionate. A first oxygen spectrum and a second oxygen spectrum are detectable by a surface analysis of the positive electrode by X-ray photoelectron spectroscopy. The first oxygen spectrum has a peak within a range of binding energy that is greater than or equal to 528 eV and less than or equal to 531 eV. The second oxygen spectrum has a peak within a range of binding energy that is greater than 531 eV and less than or equal to 535 eV. A ratio of an intensity of the first oxygen spectrum to an intensity of the second oxygen spectrum is greater than or equal to 0.30 and less than or equal to 0.80. A third oxygen spectrum and a fourth oxygen spectrum are detectable by a surface analysis of the (Continued)

negative electrode by the X-ray photoelectron spectroscopy. The third oxygen spectrum has a peak within a range of binding energy that is greater than or equal to 528 eV and less than or equal to 531 eV. The fourth oxygen spectrum has a peak within a range of binding energy that is greater than 531 eV and less than or equal to 535 eV. A ratio of an intensity of the third oxygen spectrum to an intensity of the fourth oxygen spectrum is greater than or equal to 0.82 and less than or equal to 1.35.

10 Claims, 2 Drawing Sheets

(51) Int. Cl.
  *H01M 4/525* (2010.01)
  *H01M 10/0525* (2010.01)

(56) References Cited

U.S. PATENT DOCUMENTS

| | | | |
|---|---|---|---|
| 2015/0017515 A1 | 1/2015 | Jeon et al. | |
| 2015/0340691 A1* | 11/2015 | Inoue | H01M 10/0525 |
| | | | 429/219 |
| 2016/0172707 A1 | 6/2016 | Oh et al. | |
| 2017/0271661 A1 | 9/2017 | Yasuda et al. | |

* cited by examiner

SECONDARY BATTERY

CROSS REFERENCE TO RELATED APPLICATIONS

The present application is a continuation of PCT patent application no. PCT/JP2021/033476, filed on Sep. 13, 2021, which claims priority to Japanese patent application no. JP2020-156447, filed on Sep. 17, 2020, the entire contents of which are herein incorporated by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolytic solution. A configuration of the secondary battery has been considered in various ways.

Specifically, in order to achieve a superior cyclability characteristic, in a case where a positive electrode active material includes a Ni-based compound, a result of a surface analysis of the Ni-based compound obtained by X-ray photoelectron spectroscopy (an intensity ratio of an oxygen is spectrum) is made appropriate. In order to prevent an inner short circuit from occurring, in a case where a positive electrode active material includes a composite oxide that includes lithium and a transition metal M and where a thin film is provided on a surface of a positive electrode, a result of a surface analysis of the positive electrode obtained by X-ray photoelectron spectroscopy (an intensity ratio of a 2p spectrum of the transition metal M) is made appropriate. In order to suppress swelling, in a case where a negative electrode active material includes a titanium oxide and where a film is provided on a surface of a negative electrode, a result of a surface analysis of the film obtained by X-ray photoelectron spectroscopy (a ratio between proportions of oxygen atoms) is made appropriate.

SUMMARY

The present technology relates to a secondary battery.

Although consideration has been given in various ways to improve performance of a secondary battery, a swelling characteristic, a cyclability characteristic, and a load characteristic are not sufficient yet. Accordingly, there is still room for further improvement in terms thereof.

It is therefore desirable to provide a secondary battery that is able to achieve a superior swelling characteristic, a superior cyclability characteristic, and a superior load characteristic.

A secondary battery according to an embodiment includes a positive electrode, a negative electrode, and an electrolytic solution. The positive electrode includes a lithium-nickel composite oxide. The negative electrode includes a lithium-titanium composite oxide. The electrolytic solution includes a carboxylic acid ester. The carboxylic acid ester includes at least one of ethyl acetate, propyl acetate, ethyl propionate, or propyl propionate. A first oxygen spectrum and a second oxygen spectrum are detectable by a surface analysis of the positive electrode by X-ray photoelectron spectroscopy. The first oxygen spectrum has a peak within a range of binding energy that is greater than or equal to 528 eV and less than or equal to 531 eV. The second oxygen spectrum has a peak within a range of binding energy that is greater than 531 eV and less than or equal to 535 eV. A ratio of an intensity of the first oxygen spectrum to an intensity of the second oxygen spectrum is greater than or equal to 0.30 and less than or equal to 0.80. A third oxygen spectrum and a fourth oxygen spectrum are detectable by a surface analysis of the negative electrode by the X-ray photoelectron spectroscopy. The third oxygen spectrum has a peak within a range of binding energy that is greater than or equal to 528 eV and less than or equal to 531 eV. The fourth oxygen spectrum has a peak within a range of binding energy that is greater than 531 eV and less than or equal to 535 eV. A ratio of an intensity of the third oxygen spectrum to an intensity of the fourth oxygen spectrum is greater than or equal to 0.82 and less than or equal to 1.35.

Here, the term "lithium-nickel composite oxide" is a generic term for an oxide including lithium and nickel as constituent elements, and the term "lithium-titanium composite oxide" is a generic term for an oxide including lithium and titanium as constituent elements. Note that details of each of the lithium-nickel composite oxide and the lithium-titanium composite oxide will be described later.

According to the secondary battery of an embodiment, the positive electrode includes the lithium-nickel composite oxide, the negative electrode includes the lithium-titanium composite oxide, the electrolytic solution includes the carboxylic acid ester, and the carboxylic acid ester includes, for example, ethyl acetate. Further, the result of the surface analysis of the positive electrode obtained by the X-ray photoelectron spectroscopy (the ratio of the intensity of the first oxygen spectrum to the intensity of the second oxygen spectrum) satisfies the above-described condition, and the result of the surface analysis of the negative electrode obtained by the X-ray photoelectron spectroscopy (the ratio of the intensity of the third oxygen spectrum to the intensity of the fourth oxygen spectrum) satisfies the above-described condition. Accordingly, it is possible to achieve a superior swelling characteristic, a superior cyclability characteristic, and a superior load characteristic.

Note that effects of the present technology are not necessarily limited to those described here and may include any of a series of suitable effects.

DETAILED DESCRIPTION

One or more embodiments of the present technology are described below in further detail including with reference to the drawings.

A description is given first of a secondary battery according to an embodiment of the present technology.

The secondary battery to be described here is a secondary battery that obtains a battery capacity using insertion and extraction of an electrode reactant, and includes a positive electrode, a negative electrode, and an electrolytic solution which is a liquid electrolyte. In the secondary battery, to suppress precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
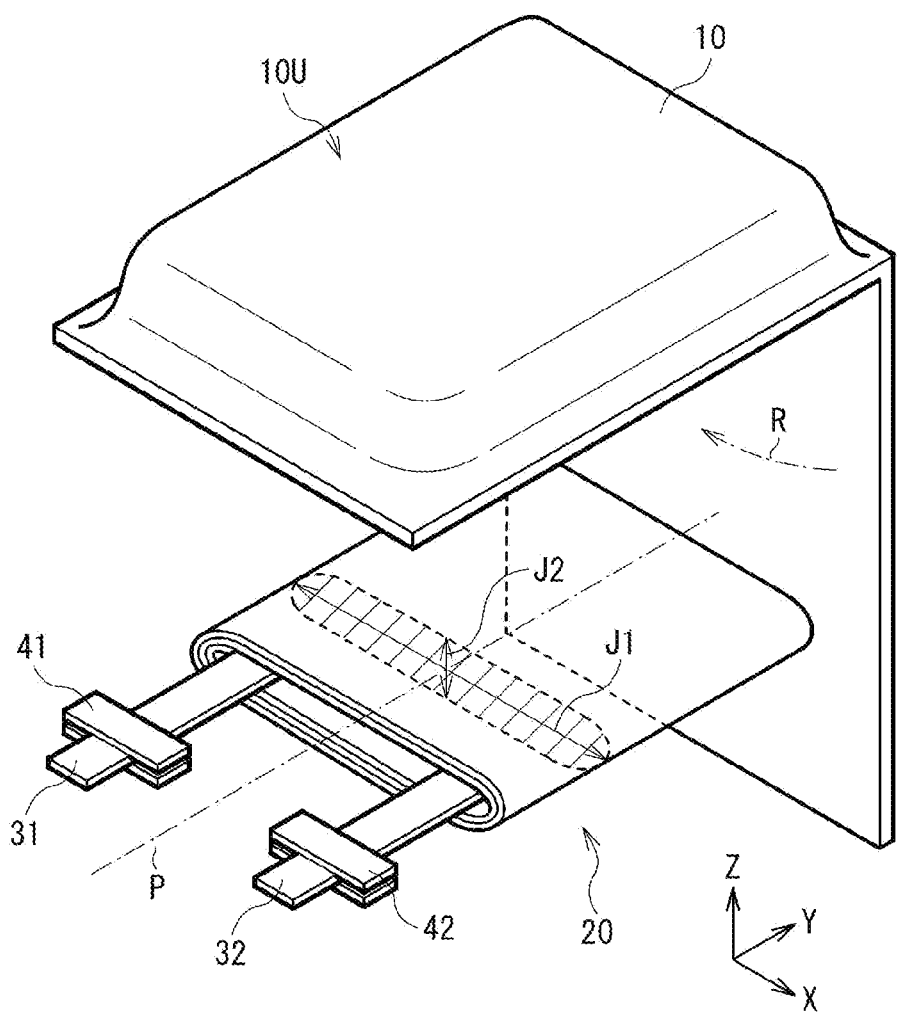
FIG. 1 is a perspective view of a configuration of a secondary battery according to one embodiment of the technology.
Figure 2:
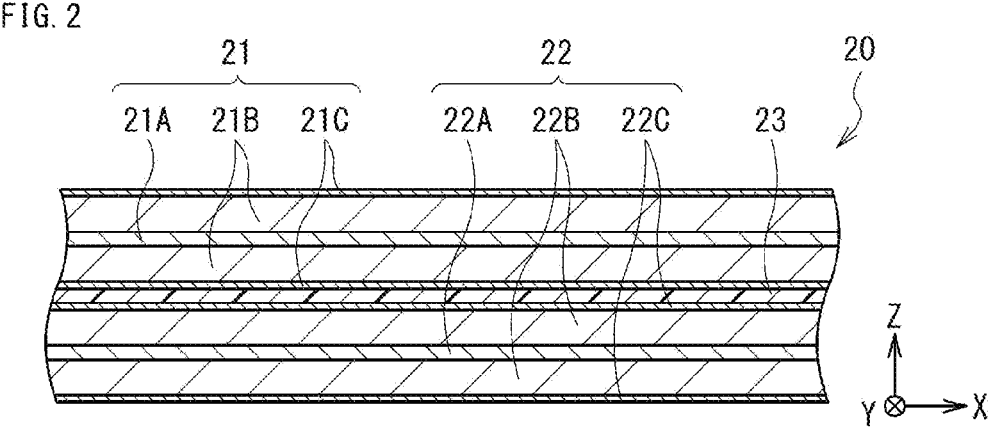
FIG. 2 is a sectional view of a configuration of a battery device illustrated in FIG. 1.

FIG. 1 illustrates a perspective configuration of the secondary battery. FIG. 2 illustrates a sectional configuration of a battery device 20 illustrated in FIG. 1. Note that FIG. 1 illustrates a state in which an outer package film 10 and the battery device 20 are separated away from each other, and a section of the battery device 20 along an XZ plane is indicated by a dashed line. FIG. 2 illustrates only a portion of the battery device 20.

As illustrated in FIGS. 1 and 2, the secondary battery includes the outer package film 10, the battery device 20, a positive electrode lead 31, a negative electrode lead 32, and sealing films 41 and 42. The secondary battery described here is a secondary battery of a laminated-film type in which the outer package film 10 having flexibility or softness is used as an outer package member to contain the battery device 20.

As illustrated in FIG. 1, the outer package film 10 is a flexible outer package member that contains the battery device 20. The outer package film 10 has a pouch-shaped structure in which the battery device 20 is sealed in a state of being contained inside the outer package film 10. The outer package film 10 thus contains a positive electrode 21, a negative electrode 22, and an electrolytic solution that are to be described later.

Here, the outer package film 10 is a single film-shaped member and is foldable in a direction R. The outer package film 10 has a depression part 10U to place the battery device 20 therein. The depression part 10U is a so-called deep drawn part.

Specifically, the outer package film 10 is a three-layered laminated film including a fusion-bonding layer, a metal layer, and a surface protective layer that are stacked in this order from an inner side. In a state in which the outer package film 10 is folded, outer edge parts of the fusion-bonding layer opposed to each other are fusion-bonded to each other. The fusion-bonding layer includes a polymer compound such as polypropylene. The metal layer includes a metal material such as aluminum. The surface protective layer includes a polymer compound such as nylon.

Note that the outer package film 10 is not particularly limited in configuration or the number of layers, and may be single-layered or two-layered, or may include four or more layers.

The sealing film 41 is interposed between the outer package film 10 and the positive electrode lead 31. The sealing film 42 is interposed between the outer package film 10 and the negative electrode lead 32. Note that the sealing film 41, the sealing film 42, or both may be omitted.

The sealing film 41 is a sealing member that prevents entry, for example, of outside air into the outer package film 10. The sealing film 41 includes a polymer compound such as a polyolefin that has adherence to the positive electrode lead 31. Examples of the polyolefin include polypropylene.

A configuration of the sealing film 42 is similar to that of the sealing film 41 except that the sealing film 42 is a sealing member that has adherence to the negative electrode lead 32. That is, the sealing film 42 includes a polymer compound such as a polyolefin that has adherence to the negative electrode lead 32.

As illustrated in FIGS. 1 and 2, the battery device 20 is a power generation device that includes the positive electrode 21, the negative electrode 22, a separator 23, and the electrolytic solution (not illustrated). The battery device 20 is contained inside the outer package film 10.

The battery device 20 is a so-called wound electrode body. That is, in the battery device 20, the positive electrode 21 and the negative electrode 22 are stacked on each other with the separator 23 interposed therebetween, and the stack of the positive electrode 21, the negative electrode 22, and the separator 23 is wound about a winding axis P. The winding axis P is a virtual axis extending in a Y-axis direction. Thus, the positive electrode 21 and the negative electrode 22 are opposed to each other with the separator 23 interposed therebetween, and are wound.

A three-dimensional shape of the battery device 20 is not particularly limited. Here, the battery device 20 has an elongated shape. Accordingly, a section of the battery device 20 intersecting the winding axis P, that is, a section of the battery device 20 along the XZ plane, has an elongated shape defined by a major axis J1 and a minor axis J2. The major axis J1 is a virtual axis that extends in an X-axis direction and has a larger length than the minor axis J2. The minor axis J2 is a virtual axis that extends in a Z-axis direction intersecting the X-axis direction and has a smaller length than the major axis J1. Here, the battery device 20 has an elongated cylindrical three-dimensional shape. Thus, the section of the battery device 20 has an elongated, generally elliptical shape.

The positive electrode 21 includes a lithium-nickel composite oxide. More specifically, the positive electrode 21 includes, as illustrated in FIG. 2, a positive electrode current collector 21A, a positive electrode active material layer 21B, and a film 21C, and the positive electrode active material layer 21B includes the lithium-nickel composite oxide.

The positive electrode current collector 21A has two opposed surfaces on which the respective positive electrode active material layers 21B are to be provided. The positive electrode current collector 21A includes an electrically conductive material such as a metal material. Examples of the metal material include aluminum.

The positive electrode active material layer 21B is provided on each of the two opposed surfaces of the positive electrode current collector 21A. The positive electrode 21 thus includes two positive electrode active material layers 21B. The positive electrode active material layer 21B includes one or more of positive electrode active materials into which lithium is insertable and from which lithium is extractable. Note that the positive electrode active material layer 21B may be provided only on one of the two opposed surfaces of the positive electrode current collector 21A, on a side where the positive electrode 21 is opposed to the negative electrode 22. The positive electrode active material layer 21B may further include, for example, a positive electrode binder and a positive electrode conductor.

The positive electrode active material includes a lithium-containing compound. More specifically, the positive electrode active material includes one or more of the above-described lithium-nickel composite oxides. The term "lithium-nickel composite oxide" is a generic term for an oxide including lithium and nickel as constituent elements, and has a layered rock-salt crystal structure. A reason why the positive electrode active material includes the lithium-nickel composite oxide is that a high energy density is obtainable, and the battery capacity is thus increased.

The lithium-nickel composite oxide is not particularly limited in kind (configuration) as long as the lithium-nickel composite oxide is an oxide including lithium and nickel as constituent elements. Specifically, the lithium-nickel composite oxide includes lithium, nickel, and one or more other elements as constituent elements. The one or more other elements are one or more of elements belonging to groups 2 to 15 in the long period periodic table of elements excluding nickel. Note that the lithium-nickel composite oxide does not necessarily include the other element as a constituent element.

More specifically, the lithium-nickel composite oxide includes one or more of compounds represented by Formula (1) below. Note that a composition of lithium differs depending on a charge and discharge state, and a value of x in Formula (1) is a value of a fully discharged state.

$$Li_xNi_{(1-y)}M1_yO_2 \qquad (1)$$

where:
M1 is at least one of elements belonging to groups 2 to 15 in the long period periodic table of elements excluding Ni; and
x and y satisfy $0.8 \leq x \leq 1.2$ and $0 \leq y < 1.0$.

As is apparent from Formula (1), a content of Ni in the lithium-nickel composite oxide is determined in accordance with a content of the other element (M1). Note that, as is apparent from a possible value range of y, the lithium-nickel composite oxide may include M1 as a constituent element, or may include no M1 as a constituent element. As long as the lithium-nickel composite oxide includes Ni as a constituent element, the content of Ni in the lithium-nickel composite oxide is not particularly limited, and may thus be set as desired.

In particular, the content of Ni in the lithium-nickel composite oxide is preferably sufficiently large. More specifically, a proportion of a number of moles of Ni to a sum of the number of moles of Ni and a number of moles of M1, i.e., a Ni proportion, is preferably greater than or equal to 80%. A reason for this is that a capacity density increases, and a high battery capacity (a high capacity per positive electrode active material) is thus obtainable. The Ni proportion is calculated as follows: Ni proportion (%)=[number of moles of Ni/(number of moles of Ni+number of moles of M1)]×100.

In other words, the lithium-nickel composite oxide preferably includes one or more of compounds represented by Formula (5) below. A reason for this is that a further higher energy density is obtainable.

$$Li_xNi_{(1-y)}M5_yO_2 \qquad (5)$$

where:
M5 is at least one of elements belonging to groups 2 to 15 in the long period periodic table of elements excluding Ni; and
x and y satisfy $0.8 \leq x \leq 1.2$ and $0 \leq y \leq 0.2$.

Specific examples of the lithium-nickel composite oxide include $LiNiO_2$, $LiNi_{0.70}Co_{0.30}O_2$, $LiNi_{0.80}Co_{0.15}Al_{0.05}O_2$, $LiNi_{0.82}Co_{0.14}Al_{0.04}O_2$, $LiNi_{0.50}Co_{0.20}Mn_{0.30}O_2$, $LiNi_{0.80}Co_{0.10}Al_{0.05}Mn_{0.05}O_2$, $LiNi_{0.80}Co_{0.20}O_2$, $LiNi_{0.82}Co_{0.18}O_2$, $LiNi_{0.85}Co_{0.15}O_2$, $LiNi_{0.90}Co_{0.10}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$. In particular, the lithium-nickel composite oxides each having the Ni proportion of greater than or equal to 80% are preferable, and examples thereof include $LiNi_{0.80}Co_{0.15}Al_{0.05}O_2$, $LiNi_{0.80}Co_{0.10}Al_{0.05}Mn_{0.05}O_2$, $LiNi_{0.80}Co_{0.20}O_2$, $LiNi_{0.82}Co_{0.18}O_2$, $LiNi_{0.85}Co_{0.15}O_2$, and $LiNi_{0.90}Co_{0.10}O_2$.

The positive electrode active material may further include one or more of other positive electrode active materials (other lithium-containing compounds), as long as the positive electrode active material includes the lithium-nickel composite oxide described above.

The other positive electrode active material is not particularly limited in kind, and specific examples thereof include a lithium-transition-metal compound. The term "lithium-transition-metal compound" is a generic term for a compound including lithium and one or more transition metal elements as constituent elements. The lithium-transition-metal compound may further include one or more other elements. The one or more other elements are not particularly limited in kind as long as the one or more other elements are each an element other than the transition metal elements. Specifically, the one or more other elements are any one or more of elements belonging to groups 2 to 15 in the long period periodic table of elements. Note that the lithium-nickel composite oxide described above is excluded from the lithium-transition-metal compound described here.

The lithium-transition-metal compound is not particularly limited in kind, and specific examples thereof include an oxide, a phosphoric acid compound, a silicic acid compound, and a boric acid compound. Specific examples of the oxide include $LiCoO_2$ and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

A method of forming the positive electrode active material layer 21B is not particularly limited, and specifically includes one or more of methods including, without limitation, a coating method.

The film 21C is a positive electrode film that is provided on a surface of the positive electrode active material layer 21B, and covers the surface of the positive electrode active material layer 21B.

Here, the film 21C is provided to cover the surface of each of the two positive electrode active material layers 21B, and the positive electrode 21 thus includes two films 21C. Note that the film 21C may be provided to cover the surface of only one of the two positive electrode active material layers 21B, and the positive electrode 21 may thus include one film 21C.

The film 21C may cover the entire surface of the positive electrode active material layer 21B, or may cover only a portion of the surface of the positive electrode active material layer 21B. Note that, in the latter case, multiple films 21C may cover the surface of the positive electrode active material layer 21B at respective locations separate from each other. FIG. 2 illustrates a case where the film 21C covers the entire surface of each of the positive electrode active material layers 21B.

Here, as will be described later, the film 21C is formed on the surface of each of the positive electrode active material layers 21B through a stabilization treatment (a first charge and discharge treatment) on the secondary battery after being assembled in a process of manufacturing the secondary battery. The film 21C mainly includes one or more of products including, without limitation, a reaction product and a decomposition product of a carboxylic acid ester included in the electrolytic solution to be described later, and is thus a film derived from the carboxylic acid ester. Accordingly, the film 21C includes oxygen as a constituent element.

In the secondary battery, a predetermined condition is satisfied regarding a physical property of the positive electrode 21, that is, a physical property of the film 21C in order to improve each of a swelling characteristic, a cyclability characteristic, and a load characteristic. Details of the physical property of the positive electrode 21 (the film 21C) will be described later.

The negative electrode 22 includes a lithium-titanium composite oxide. More specifically, the negative electrode 22 includes, as illustrated in FIG. 2, a negative electrode current collector 22A, a negative electrode active material layer 22B, and a film 22C, and the negative electrode active material layer 22B includes the lithium-titanium composite oxide.

The negative electrode current collector 22A has two opposed surfaces on which the respective negative electrode active material layers 22B are to be provided. The negative electrode current collector 22A includes an electrically conductive material such as a metal material. Examples of the metal material include copper.

The negative electrode active material layer 22B is provided on each of the two opposed surfaces of the negative electrode current collector 22A. The negative electrode 22 thus includes two negative electrode active material layers 22B. The negative electrode active material layer 22B includes one or more of negative electrode active materials into which lithium is insertable and from which lithium is extractable. Note that the negative electrode active material layer 22B may be provided only on one of the two opposed surfaces of the negative electrode current collector 22A, on a side where the negative electrode 22 is opposed to the positive electrode 21. The negative electrode active material layer 22B may further include, for example, a negative electrode binder and a negative electrode conductor. Details of the negative electrode binder are similar to those of the positive electrode binder. Details of the negative electrode conductor are similar to those of the positive electrode conductor.

The negative electrode active material includes one or more of the above-described lithium-titanium composite oxides. The term "lithium-titanium composite oxide" is a generic term for an oxide including lithium and titanium as constituent elements, and has a spinel crystal structure. A reason why the negative electrode active material includes the lithium-titanium composite oxide is that this prevents a discharge capacity from decreasing easily even upon repeated charging and discharging, and thus improves the cyclability characteristic.

The lithium-titanium composite oxide is not particularly limited in kind (configuration) as long as the lithium-titanium composite oxide is an oxide including lithium and titanium as constituent elements. Specifically, the lithium-titanium composite oxide includes lithium, titanium, and one or more other elements as constituent elements. The one or more other elements are one or more of elements belonging to groups 2 to 15 in the long period periodic table of elements excluding titanium. Note that an oxide including lithium, titanium, and nickel as constituent elements shall be classified as the lithium-titanium composite oxide, not as the lithium-nickel composite oxide.

More specifically, the lithium-titanium composite oxide includes one or more of respective compounds represented by Formula (2), Formula (3), and Formula (4) below. M2 in Formula (2) is a metal element that is to be a divalent ion. M3 in Formula (3) is a metal element that is to be a trivalent ion. M4 in Formula (4) is a metal element that is to be a tetravalent ion. A reason why the lithium-titanium composite oxide includes one or more of the respective compounds represented by Formula (2), Formula (3), and Formula (4) below is that this sufficiently prevents a discharge capacity from easily decreasing even upon repeated charging and discharging, and thus sufficiently improves the cyclability characteristic.

$$\text{Li}[\text{Li}_x\text{M2}_{(1-3x)/2}\text{Ti}_{(3+x)/2}]\text{O}_4 \quad (2)$$

where:
M2 is at least one of Mg, Ca, Cu, Zn, or Sr; and
x satisfies $0 \leq x \leq 1/3$.

$$\text{Li}[\text{Li}_y\text{M3}_{1-3y}\text{Ti}_{1+2y}]\text{O}_4 \quad (3)$$

where:
M3 is at least one of Al, Sc, Cr, Mn, Fe, Ga, or Y; and
y satisfies $0 \leq y \leq 1/3$.

$$\text{Li}[\text{Li}_{1/3}\text{M4}_z\text{Ti}_{(5/3)-z}]\text{O}_4 \quad (4)$$

where:
M4 is at least one of V, Zr, or Nb; and
z satisfies $0 \leq z \leq 2/3$.

As is apparent from a possible value range of x in Formula (2), the lithium-titanium composite oxide represented by Formula (2) may include M2 that is the other element as a constituent element, or may include no M2 as a constituent element. As is apparent from a possible value range of y in Formula (3), the lithium-titanium composite oxide represented by Formula (3) may include M3 that is the other element as a constituent element, or may include no M3 as a constituent element. As is apparent from a possible value range of z in Formula (4), the lithium-titanium composite oxide represented by Formula (4) may include M4 that is the other element as a constituent element, or may include no M4 as a constituent element.

Specific examples of the lithium-titanium composite oxide represented by Formula (2) include $\text{Li}_{3.75}\text{Ti}_{4.875}\text{Mg}_{0.375}\text{O}_{12}$. Specific examples of the lithium-titanium composite oxide represented by Formula (3) include $\text{LiCrTiO}_4$. Specific examples of the lithium-titanium composite oxide represented by Formula (4) include $\text{Li}_4\text{Ti}_5\text{O}_{12}$ and $\text{Li}_4\text{Ti}_{4.95}\text{Nb}_{0.05}\text{O}_{12}$.

The negative electrode active material may further include one or more of other negative electrode active materials, as long as the negative electrode active material includes the lithium-titanium composite oxide described above.

The other negative electrode active material is not particularly limited in kind, and specifically includes a carbon material, a metal-based material, or both, for example. A reason for this is that a high energy density is obtainable. Examples of the carbon material include graphitizable carbon, non-graphitizable carbon, and graphite (natural graphite and artificial graphite). The term "metal-based material" is a generic term for a material that includes one or more elements among metal elements and metalloid elements that are each able to form an alloy with lithium. Examples of such metal elements and metalloid elements include silicon, tin, or both. Note that the metal-based material may be a simple substance, an alloy, a compound, a mixture of two or more thereof, or a material including two or more phases thereof. Note that the lithium-titanium composite oxide described above is excluded from the metal-based material described here. Specific examples of the metal-based material include $TiSi_2$ and $SiO_x$ ($0 < x \leq 2$ or $0.2 < x < 1.4$).

A method of forming the negative electrode active material layer 22B is not particularly limited, and specifically includes one or more of methods including, without limitation, a coating method, a vapor-phase method, a liquid-phase method, a thermal spraying method, and a firing (sintering) method.

The film 22C is a negative electrode film that is provided on a surface of the negative electrode active material layer 22B, and covers the surface of the negative electrode active material layer 22B.

Here, the film 22C is provided to cover the surface of each of the two negative electrode active material layers 22B, and the negative electrode 22 thus includes two films 22C. Note that the film 22C may be provided to cover the surface of only one of the two negative electrode active material layers 22B, and the negative electrode 22 may thus include one film 22C.

The film 22C may cover the entire surface of the negative electrode active material layer 22B, or may cover only a portion of the surface of the negative electrode active material layer 22B. Note that, in the latter case, multiple films 22C may cover the surface of the negative electrode active material layer 22B at respective locations separate from each other. FIG. 2 illustrates a case where the film 22C covers the entire surface of each of the negative electrode active material layers 22B.

Here, the film 22C is formed by a procedure similar to that of forming the film 21C. In other words, as will be described later, the film 22C is formed on the surface of each of the negative electrode active material layers 22B through the stabilization treatment (the first charge and discharge treatment) on the secondary battery after being assembled in the process of manufacturing the secondary battery. The film 22C mainly includes, as with the film 21C, one or more of products including, without limitation, a reaction product and a decomposition product of a carboxylic acid ester included in the electrolytic solution to be described later, and is thus a film derived from the carboxylic acid ester. Accordingly, the film 22C includes oxygen as a constituent element.

In the secondary battery, a predetermined condition may be satisfied regarding a physical property of the negative electrode 22, that is, a physical property of the film 22C in order to improve each of the swelling characteristic, the cyclability characteristic, and the load characteristic. Details of the physical property of the negative electrode 22 (the film 22C) will be described later.

The separator 23 is an insulating porous film interposed between the positive electrode 21 and the negative electrode 22 as illustrated in FIG. 2, and allows lithium ions to pass therethrough while preventing contact (a short circuit) between the positive electrode 21 and the negative electrode 22. The separator 23 includes a polymer compound such as polyethylene.

(Electrolytic Solution)

The electrolytic solution includes the carboxylic acid ester. The carboxylic acid ester includes one or more of ethyl acetate, propyl acetate, ethyl propionate, or propyl propionate. The positive electrode 21, the negative electrode 22, and the separator 23 are each impregnated with the electrolytic solution. A reason why the electrolytic solution includes the carboxylic acid ester is that a decomposition reaction of the electrolytic solution is suppressed upon charging and discharging, which suppresses gas generation due to the decomposition reaction of the electrolytic solution.

In particular, the carboxylic ester preferably includes ethyl propionate, propyl propionate, or both. A reason for this is that the decomposition reaction of the electrolytic solution is sufficiently suppressed, and thus the gas generation due to the decomposition reaction of the electrolytic solution is also sufficiently suppressed.

Here, the electrolytic solution includes a solvent and an electrolyte salt. The solvent includes the carboxylic acid ester. The solvent may further include one or more of non-aqueous solvents (organic solvents). Note that the carboxylic acid ester described above is excluded from the non-aqueous solvent described here.

Although not particularly limited, a content of the carboxylic acid ester in the solvent is preferably within a range from 50 wt % to 90 wt % both inclusive in particular. A reason for this is that the decomposition reaction of the electrolytic solution is sufficiently suppressed, and thus the gas generation due to the decomposition reaction of the electrolytic solution is also sufficiently suppressed.

The non-aqueous solvent includes one or more of compounds including, without limitation, a carbonic-acid-ester-based compound and a lactone-based compound. An electrolytic solution including the non-aqueous solvent is a so-called non-aqueous electrolytic solution. A reason for this is that a dissociation property of the electrolyte salt improves and mobility of ions also improves.

Specifically, examples of the carbonic-acid-ester-based compound include a cyclic carbonic acid ester and a chain carbonic acid ester. Specific examples of the cyclic carbonic acid ester include ethylene carbonate and propylene carbonate. Specific examples of the chain carbonic acid ester include dimethyl carbonate, diethyl carbonate, and methyl ethyl carbonate. Specific examples of the lactone-based compound include γ-butyrolactone and γ-valerolactone.

In particular, the non-aqueous solvent preferably includes one or more of cyclic carbonic acid esters. In other words, the solvent preferably includes the cyclic carbonic acid ester together with the carboxylic acid ester. A reason for this is that the decomposition reaction of the electrolytic solution is sufficiently suppressed while the dissociation property of the electrolyte salt and the mobility of ions are secured.

The electrolyte salt includes one or more of light metal salts including, without limitation, a lithium salt. Specific examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide ($LiN(CF_3SO_2)_2$), lithium tris(trifluoromethanesulfonyl)methide ($LiC(CF_3SO_2)_3$), lithium difluoro(oxalato)borate ($LiBF_2(C_2O_4)$), and lithium bis(oxalato) borate ($LiB(C_2O_4)_2$).

The electrolytic solution may further include one or more of additives. Although not particularly limited in kind, specific examples of the additive include an unsaturated cyclic carbonic acid ester, a halogenated carbonic acid ester, a sulfonic acid ester, a phosphoric acid ester, an acid anhydride, a nitrile compound, and an isocyanate compound. A reason for this is that chemical stability of the electrolytic solution improves.

As illustrated in FIG. 1, the positive electrode lead 31 is a positive electrode terminal coupled to the battery device 20 (the positive electrode 21), and, more specifically, to the positive electrode current collector 21A. The positive electrode lead 31 is led out from an inside to an outside of the outer package film 10, and includes an electrically conductive material such as aluminum. Although the positive electrode lead 31 is not particularly limited in shape, the positive electrode lead 31 specifically has one or more of shapes including, without limitation, a thin-plate shape and a meshed shape.

As illustrated in FIG. 1, the negative electrode lead 32 is a negative electrode terminal coupled to the battery device 20 (the negative electrode 22), and, more specifically, to the negative electrode current collector 22A. The negative electrode lead 32 is led out from the inside to the outside of the outer package film 10, and includes an electrically conductive material such as copper. Here, the direction in which the negative electrode lead 32 is led out is similar to that in which the positive electrode lead 31 is led out. Note that details of a shape of the negative electrode lead 32 is similar to those of the shape of the positive electrode lead 31.

In the secondary battery, as described above, conditions to be described below regarding the physical property of the positive electrode 21 and the physical property of the negative electrode 22 are satisfied, in order to improve each of the swelling characteristic, the cyclability characteristic, and the load characteristic.

Regarding the physical property of the positive electrode 21, a predetermined condition is satisfied. In other words, the physical property of the positive electrode 21 defined by a result of a surface analysis obtained by X-ray photoelectron spectroscopy (XPS) is made appropriate, as will be described below.

Specifically, two XPS spectra are detectable by a surface analysis of the positive electrode 21 by XPS. Here, the positive electrode 21 includes the film 21C together with the positive electrode active material layer 21B, and the film 21C is thus analyzed in the surface analysis of the positive electrode 21 by XPS.

A first XPS spectrum is an XPS spectrum attributable to oxygen atoms included in the film 21C as a constituent element, more specifically, a first oxygen (O1s) spectrum having a peak within a range of binding energy that is greater than or equal to 528 eV and less than or equal to 531 eV. The first oxygen spectrum is considered to be detected mainly due to, for example, a constituent component of the positive electrode active material layer 21B (the lithium-nickel composite oxide as the positive electrode active material), a bonding state of oxygen atoms in the crystal structure of the positive electrode active material, and a constituent component of the film 21C.

A second XPS spectrum is another XPS spectrum attributable to oxygen atoms in the film 21C as with the first XPS spectrum, more specifically, a second oxygen spectrum having a peak within a range of binding energy that is greater than 531 eV and less than or equal to 535 eV. Similarly to the above-described first oxygen spectrum, the second oxygen spectrum is considered to be detected mainly due to, for example, the constituent component of the positive electrode active material layer 21B (the positive electrode active material), the bonding state of oxygen atoms in the crystal structure of the positive electrode active material, and the constituent component of the film 21C.

In this case, a ratio defined on the basis of respective intensities of the two XPS spectra (the first oxygen spectrum and the second oxygen spectrum) described above, that is, a ratio (a positive electrode intensity ratio) of an intensity of the first oxygen spectrum to an intensity of the second oxygen spectrum is within a range from 0.30 to 0.80 both inclusive. The positive electrode intensity ratio is calculated as follows: positive electrode intensity ratio=intensity of first oxygen spectrum/intensity of second oxygen spectrum. Note that a value of the positive electrode intensity ratio is rounded off to two decimal places.

A reason why the above-described condition is satisfied regarding the physical property of the positive electrode 21 (i.e., the positive electrode intensity ratio) is as follows. In a case where the positive electrode active material layer 21B (the positive electrode active material) includes the lithium-nickel composite oxide and where the film 21C derived from the carboxylic acid ester included in the electrolytic solution is provided on the surface of the positive electrode active material layer 21B, the physical property of the positive electrode 21 (the film 21C) is made appropriate. This suppresses an oxidative decomposition reaction of the electrolytic solution in the positive electrode 21.

As a result, first, gas generation due to the oxidative decomposition reaction of the electrolytic solution is prevented from occurring easily, which prevents the secondary battery from swelling easily. In this case, in particular, even if a by-product with high reducibility is generated during the oxidative decomposition reaction of the electrolytic solution, gas generation due to reductive decomposition of the by-product in the negative electrode 22 is also suppressed, which markedly prevents the secondary battery from swelling easily. Second, owing to the oxidative decomposition reaction of the electrolytic solution being suppressed upon charging and discharging, an amount of the electrolytic solution is prevented from excessively decreasing easily, which prevents the discharge capacity from decreasing easily even upon repeated charging and discharging. Third, it becomes easier for lithium ions to smoothly enter and exit the positive electrode 21 upon charging and discharging, which makes it easier for the lithium ions to be inserted into and extracted from the positive electrode 21.

The intensity of the first oxygen spectrum and the intensity of the second oxygen spectrum are each adjustable by varying a composition (for example, a kind and a content of a constituent element other than lithium and oxygen) of the positive electrode active material (the lithium-nickel composite oxide). Specific examples of the constituent element other than lithium and oxygen include nickel, cobalt, aluminum, and manganese. In addition, the intensity of the first oxygen spectrum and the intensity of the second oxygen spectrum are also each adjustable by varying, upon covering the surface of the positive electrode active material with a film including any element, an amount of the film covering the surface. Further, the intensity of the first oxygen spectrum and the intensity of the second oxygen spectrum are also each adjustable by varying a composition (for example, a kind of the solvent and a kind of the electrolyte salt) of the electrolytic solution. Accordingly, it is possible to control the positive electrode intensity ratio in such a manner as to be a desired value.

A procedure of identifying the positive electrode intensity ratio is as described below. In this case, for example, a scanning X-ray photoelectron spectrometer PHI Quantera available from ULVAC-PHI, Inc. is used as an XPS analyzer.

First, the secondary battery which is completed is disassembled to thereby collect the positive electrode 21. Thereafter, the positive electrode 21 is washed with an organic solvent, following which the positive electrode 21 is dried. Although the organic solvent is not particularly limited in kind, specific examples thereof include dimethyl carbonate. Thereafter, the surface analysis of the positive electrode 21 is performed by the XPS analyzer to thereby measure the intensity of the first oxygen spectrum and the intensity of the second oxygen spectrum. Lastly, the positive electrode intensity ratio is calculated on the basis of the intensity of the first oxygen spectrum and the intensity of the second oxygen spectrum.

Regarding the physical property of the negative electrode 22, a predetermined condition is satisfied.

Specifically, two XPS spectra are detectable by a surface analysis of the negative electrode 22 by XPS. Here, the negative electrode 22 includes the film 22C together with the negative electrode active material layer 22B, and the film 22C is thus analyzed in the surface analysis of the negative electrode 22 by XPS.

A first XPS spectrum is an XPS spectrum attributable to oxygen atoms included in the film 22C as a constituent element, more specifically, a third oxygen spectrum having a peak within a range of binding energy that is greater than or equal to 528 eV and less than or equal to 531 eV. Factors due to which the third oxygen spectrum is detected are similar to those due to which the first oxygen spectrum is detected except that the third oxygen spectrum is detected due to the oxygen atoms in the film 22C, not in the film 21C.

A second XPS spectrum is another XPS spectrum attributable to oxygen atoms in the film 22C as with the first XPS spectrum, more specifically, a fourth oxygen spectrum having a peak within a range of binding energy that is greater than 531 eV and less than or equal to 535 eV. Factors due to which the fourth oxygen spectrum is detected are similar to those due to which the second oxygen spectrum is detected except that the fourth oxygen spectrum is detected due to the oxygen atoms in the film 22C, not in the film 21C.

In this case, a ratio defined on the basis of respective intensities of the two XPS spectra (the third oxygen spectrum and the fourth oxygen spectrum) described above, that is, a ratio (a negative electrode intensity ratio) of an intensity of the third oxygen spectrum to an intensity of the fourth oxygen spectrum is not particularly limited, and is preferably within a range from 0.82 to 1.35 both inclusive in particular. The negative electrode intensity ratio is calculated as follows: negative electrode intensity ratio=intensity of third oxygen spectrum/intensity of fourth oxygen spectrum. Note that a value of the negative electrode intensity ratio is rounded off to two decimal places, as with the value of the positive electrode intensity ratio.

A reason why the above-described condition is satisfied regarding the physical property of the negative electrode 22 (i.e., the negative electrode intensity ratio) is as follows. In a case where the negative electrode active material layer 22B (the negative electrode active material) includes the lithium-titanium composite oxide and where the film 22C derived from the carboxylic acid ester included in the electrolytic solution is provided on the surface of the negative electrode active material layer 22B, the physical property of the negative electrode 22 (the film 22C) is made appropriate. This suppresses a reductive decomposition reaction of the electrolytic solution in the negative electrode 22. As a result, reduction in the discharge capacity is suppressed even upon repeated charging and discharging, and insertability and extractability of lithium ions are improved upon charging and discharging, while swelling of the secondary battery is suppressed.

The intensity of the third oxygen spectrum and the intensity of the fourth oxygen spectrum are each adjustable by varying a kind of the negative electrode active material (the lithium-titanium composite oxide) and a composition (for example, a kind of the additive) of the negative electrode active material layer 22B. In addition, the intensity of the third oxygen spectrum and the intensity of the fourth oxygen spectrum are also each adjustable by varying a composition (for example, a kind of the solvent and a kind of the electrolyte salt) of the electrolytic solution. Accordingly, it is possible to control the negative electrode intensity ratio in such a manner as to be a desired value.

Note that a procedure of identifying the negative electrode intensity ratio is similar to the procedure of identifying the positive electrode intensity ratio except that the surface analysis of the negative electrode 22 is performed instead of the surface analysis of the positive electrode 21.

Upon charging, in the battery device 20, lithium is extracted from the positive electrode 21, and the extracted lithium is inserted into the negative electrode 22 via the electrolytic solution. Upon discharging, in the battery device 20, lithium is extracted from the negative electrode 22, and the extracted lithium is inserted into the positive electrode 21 via the electrolytic solution. Upon charging and upon discharging, lithium is inserted and extracted in an ionic state.

In a case of manufacturing the secondary battery, the positive electrode 21 and the negative electrode 22 are fabricated and the electrolytic solution is prepared, following which the secondary battery is fabricated using the positive electrode 21, the negative electrode 22, and the electrolytic solution, according to a procedure to be described below.

First, a mixture (a positive electrode mixture) of the positive electrode active material including the lithium-nickel composite oxide and other materials including, without limitation, the positive electrode binder and the positive electrode conductor is put into the solvent to thereby prepare a paste positive electrode mixture slurry. Thereafter, the positive electrode mixture slurry is applied on the two opposed surfaces of the positive electrode current collector 21A to thereby form the positive electrode active material layers 21B. Thereafter, the positive electrode active material layers 21B may be compression-molded by means of, for example, a roll pressing machine. In this case, the positive electrode active material layers 21B may be heated. The positive electrode active material layers 21B may be compression-molded multiple times.

In this manner, the positive electrode active material layers 21B are formed on the respective two opposed surfaces of the positive electrode current collector 21A. Thus, a positive electrode precursor (not illustrated) is fabricated. The positive electrode precursor has a configuration similar to that of the positive electrode 21 except that no film 21C is provided on the surface of each of the positive electrode active material layers 21B. Lastly, the film 21C is formed on the surface of each of the positive electrode active material layers 21B through the stabilization treatment (the first charge and discharge treatment) on the secondary battery after being assembled to be described later. Thus, the positive electrode 21 is fabricated.

The negative electrode 22 is formed by a procedure similar to the fabrication procedure of the positive electrode 21 described above. Specifically, first, a mixture (a negative electrode mixture) of the negative electrode active material including the lithium-titanium composite oxide and other materials including, without limitation, the negative electrode binder and the negative electrode conductor is put into the solvent to thereby prepare a paste negative electrode mixture slurry. Thereafter, the negative electrode mixture slurry is applied on the two opposed surfaces of the negative electrode current collector 22A to thereby form the negative electrode active material layers 22B. Thereafter, the negative electrode active material layers 22B may be compression-molded.

In this manner, the negative electrode active material layers 22B are formed on the respective two opposed surfaces of the negative electrode current collector 22A. Thus, a negative electrode precursor (not illustrated) is fabricated. The negative electrode precursor has a configuration similar to that of the negative electrode 22 except that no film 22C is provided on the surface of each of the negative electrode active material layers 22B. Lastly, the film 22C is formed on the surface of each of the negative electrode active material layers 22B through the stabilization treatment (the first charge and discharge treatment) on the secondary battery after being assembled to be described later. Thus, the negative electrode 22 is fabricated.

The electrolyte salt is put into the solvent including the carboxylic acid ester. The electrolyte salt is thereby dispersed or dissolved in the solvent. As a result, the electrolytic solution is prepared.

First, the positive electrode lead 31 is coupled to the positive electrode precursor (the positive electrode current collector 21A) by a method such as a welding method, and the negative electrode lead 32 is coupled to the negative electrode precursor (the negative electrode current collector 22A) by a method such as a welding method.

Thereafter, the positive electrode precursor and the negative electrode precursor are stacked on each other with the separator 23 interposed therebetween, following which the stack of the positive electrode precursor, the negative electrode precursor, and the separator 23 is wound about the winding axis P to thereby fabricate a wound body. Thereafter, the wound body is pressed by means of, for example, a pressing machine to thereby shape the wound body into an elongated shape.

Thereafter, the wound body is placed inside the depression part 10U, following which the outer package film 10 is folded in the direction R to thereby cause portions of the outer package film 10 to be opposed to each other. Thereafter, outer edge parts of two sides of the outer package film 10 (the fusion-bonding layer) opposed to each other are joined to each other by a method such as a thermal-fusion-bonding method to thereby contain the wound body in the outer package film 10 having the pouch shape.

Lastly, the electrolytic solution is injected into the outer package film 10 having the pouch shape, following which the outer edge parts of the remaining one side of the outer package film 10 (the fusion-bonding layer) are joined to each other by a method such as a thermal-fusion-bonding method. In this case, the sealing film 41 is interposed between the outer package film 10 and the positive electrode lead 31, and the sealing film 42 is interposed between the outer package film 10 and the negative electrode lead 32. The wound body is thereby impregnated with the electrolytic solution. Thus, the battery device 20 which is the wound electrode body is fabricated. In this manner, the battery device 20 is sealed in the outer package film 10 having the pouch shape. As a result, the secondary battery is assembled.

The assembled secondary battery is charged and discharged. Various conditions including, for example, an environment temperature, the number of times of charging and discharging (the number of cycles), and charging and discharging conditions may be set as desired.

Through this process, as described above, the film 21C is formed on the surface of each of the positive electrode active material layers 21B and the positive electrode 21 is thus fabricated, and the film 22C is also formed on the surface of each of the negative electrode active material layers 22B and the negative electrode 22 is thus fabricated. In this case, the surface of each of the positive electrode active material layers 21B is protected by the film 21C, and the surface of each of the negative electrode active material layers 22B is protected by the film 22C, which brings the secondary battery into an electrochemically stable state.

Thus, the secondary battery including the outer package film 10, that is, the secondary battery of the laminated-film type, is completed.

According to the secondary battery, the positive electrode 21 includes the lithium-nickel composite oxide, the negative electrode 22 includes the lithium-titanium composite oxide, and the electrolytic solution includes the carboxylic acid ester such as ethyl acetate. Further, the result of the surface analysis of the positive electrode 21 obtained by XPS, i.e., the positive electrode intensity ratio, satisfies the above-described condition (the positive electrode intensity ratio is within the range from 0.30 to 0.80 both inclusive), and the result of the surface analysis of the negative electrode 22 obtained by XPS, i.e., the negative electrode intensity ratio, satisfies the above-described condition (the negative electrode intensity ratio is within the range from 0.82 to 1.35 both inclusive).

In this case, as described above, the physical property of the positive electrode 21 (the positive electrode intensity ratio) defined by the two XPS spectra (the first oxygen spectrum and the second oxygen spectrum) is made appropriate, which suppresses the oxidative decomposition reaction of the electrolytic solution in the positive electrode 21. This suppresses gas generation due to the oxidative decomposition reaction of the electrolytic solution in the positive electrode 21, and also suppresses gas generation due to the reductive decomposition reaction of the by-product with high reducibility in the negative electrode 22, which markedly prevents the secondary battery from swelling easily. In addition, the amount of the electrolytic solution is prevented from excessively decreasing easily upon charging and discharging, which prevents the discharge capacity from decreasing easily even upon repeated charging and discharging. Moreover, it becomes easier for lithium ions to smoothly enter and exit the positive electrode 21 upon charging and discharging, which makes it easier for the lithium ions to be inserted into and extracted from the positive electrode 21.

Further, as described above, the physical property (the negative electrode intensity ratio) of the negative electrode 22 defined by the two XPS spectra (the third oxygen spectrum and the fourth oxygen spectrum) is made appropriate, which suppresses the reductive decomposition reaction of the electrolytic solution in the negative electrode 22. As a result, reduction in the discharge capacity is further suppressed even upon repeated charging and discharging, and insertability and extractability of lithium ions are further improved upon charging and discharging, while the swelling of the secondary battery is further suppressed.

Based upon the foregoing, the reduction in the discharge capacity is suppressed even upon repeated charging and discharging, and the insertability and the extractability of the lithium ions are improved upon charging and discharging, while the swelling of the secondary battery is markedly suppressed. Accordingly, it is possible to achieve a superior swelling characteristic, a superior cyclability characteristic, and a superior load characteristic.

In particular, the lithium-nickel composite oxide may include the compound represented by Formula (1). This allows for a sufficiently high energy density. Accordingly, it is possible to achieve higher effects. In this case, the Ni proportion may be greater than or equal to 80%. This allows for a higher energy density. Accordingly, it is possible to achieve further higher effects.

Further, the solvent of the electrolytic solution may include the carboxylic acid ester, and the content of the carboxylic acid ester in the solvent may be within the range from 50 wt % to 90 wt % both inclusive. This sufficiently suppresses the decomposition reaction of the electrolytic solution. Accordingly, it is possible to achieve higher effects. In this case, the solvent may further include the cyclic carbonic acid ester. This sufficiently suppresses the decomposition reaction of the electrolytic solution while securing each of the dissociation property of the electrolyte salt and the mobility of ions. Accordingly, it is possible to achieve further higher effects.

Further, the positive electrode 21 may include the positive electrode active material layer 21B (including the lithium-nickel composite oxide) and the film 21C (including oxygen as a constituent element), and the surface analysis of the positive electrode 21 by XPS may include an analysis of the film 21C. This sufficiently suppresses the decomposition reaction of the electrolytic solution in the positive electrode 21. Accordingly, it is possible to achieve higher effects.

Further, the lithium-titanium composite oxide may include one or more of the respective compounds represented by Formula (2), Formula (3), and Formula (4). This sufficiently prevents the discharge capacity from decreasing easily even upon repeated charging and discharging. Accordingly, it is possible to achieve higher effects.

Further, the negative electrode 22 may include the negative electrode active material layer 22B (including the lithium-titanium composite oxide) and the film 22C (including oxygen as a constituent element), and the surface analysis of the negative electrode 22 by XPS may include an analysis of the film 22C. This sufficiently suppresses the decomposition reaction of the electrolytic solution in the negative electrode 22. Accordingly, it is possible to achieve higher effects.

Further, the secondary battery may include the outer package film 10 having flexibility. This effectively prevents the secondary battery from easily swelling even if the outer package film 10 is used which is easily deformable in response to an increase in internal pressure. Accordingly, it is possible to achieve higher effects.

Further, the secondary battery may include a lithium-ion secondary battery. This makes it possible to obtain a sufficient battery capacity stably through the use of insertion and extraction of lithium. Accordingly, it is possible to achieve higher effects.

The configuration of the secondary battery is appropriately modifiable as described below. Note that any two or more of the following series of modifications may be combined with each other.

The separator 23 which is a porous film is used. However, although not specifically illustrated here, the separator 23 of a stacked type including a polymer compound layer may be used instead of the separator 23 which is the porous film.

Specifically, the separator 23 of the stacked type includes a porous film having two opposed surfaces, and a polymer compound layer provided on one of or each of the two opposed surfaces of the porous film. A reason for this is that adherence of the separator 23 to each of the positive electrode 21 and the negative electrode 22 improves to suppress the occurrence of misalignment (irregular winding) of the battery device 20. This helps to prevent the secondary battery from easily swelling even if, for example, the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include one or more kinds of insulating particles. A reason for this is that the insulating particles dissipate heat upon heat generation by the secondary battery, thus improving safety or heat resistance of the secondary battery. Examples of the insulating particles include inorganic particles and resin particles. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator 23 of the stacked type, a precursor solution including, without limitation, the polymer compound and an organic solvent is prepared, following which the precursor solution is applied on one of or each of the two opposed surfaces of the porous film. In another example, the porous film may be immersed in the precursor solution. In this case, insulating particles may be added to the precursor solution on an as-needed basis.

In the case where the separator 23 of the stacked type is used also, lithium ions are movable between the positive electrode 21 and the negative electrode 22, and similar effects are therefore obtainable.

The electrolytic solution which is a liquid electrolyte is used. However, although not specifically illustrated here, an electrolyte layer which is a gel electrolyte may be used instead of the electrolytic solution.

In the battery device 20 including the electrolyte layer, the positive electrode 21 and the negative electrode 22 are stacked on each other with the separator 23 and the electrolyte layer interposed therebetween, and the stack of the positive electrode 21, the negative electrode 22, the separator 23, and the electrolyte layer is wound. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound in the electrolyte layer. A reason for this is that leakage of the electrolytic solution is prevented. The configuration of the electrolytic solution is as described above. The polymer compound includes, for example, polyvinylidene difluoride. In a case of forming the electrolyte layer, a precursor solution including, for example, the electrolytic solution, the polymer compound, and an organic solvent is prepared, following which the precursor solution is applied on one side or both sides of the positive electrode 21 and on one side or both sides of the negative electrode 22.

In the case where the electrolyte layer is used also, lithium ions are movable between the positive electrode 21 and the negative electrode 22 via the electrolyte layer, and similar effects are therefore obtainable.

Applications (application examples) of the secondary battery are not particularly limited. The secondary battery used as a power source may serve as a main power source or an auxiliary power source of, for example, electronic equipment and an electric vehicle. The main power source is preferentially used regardless of the presence of any other power source. The auxiliary power source is used in place of the main power source, or is switched from the main power source.

Specific examples of the applications of the secondary battery include: electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems or industrial battery systems for accumulation of electric power for a situation such as emergency. The above-described applications may each use one secondary battery, or may each use multiple secondary batteries.

The battery packs may each include a single battery, or may each include an assembled battery. The electric vehicle is a vehicle that operates (travels) using the secondary battery as a driving power source, and may be a hybrid automobile that is additionally provided with a driving source other than the secondary battery. In an electric power storage system for home use, electric power accumulated in the secondary battery which is an electric power storage source may be utilized for using, for example, home appliances.

An application example of the secondary battery will now be described in detail. The configuration of the application example described below is merely an example, and is appropriately modifiable.

Figure 3:
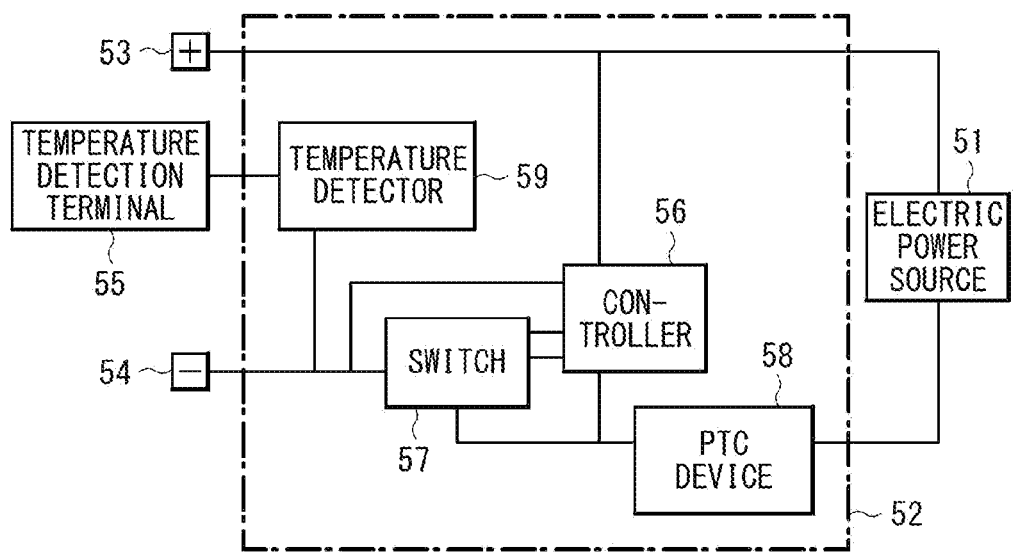
FIG. 3 is a block diagram illustrating a configuration of an application example of the secondary battery.

FIG. 3 illustrates a block configuration of a battery pack. The battery pack described here is a battery pack (a so-called soft pack) including one secondary battery, and is to be mounted on, for example, electronic equipment typified by a smartphone.

As illustrated in FIG. 3, the battery pack includes an electric power source 51 and a circuit board 52. The circuit board 52 is coupled to the electric power source 51, and includes a positive electrode terminal 53, a negative electrode terminal 54, and a temperature detection terminal 55.

The electric power source 51 includes one secondary battery. The secondary battery has a positive electrode lead coupled to the positive electrode terminal 53 and a negative electrode lead coupled to the negative electrode terminal 54. The electric power source 51 is couplable to outside via the positive electrode terminal 53 and the negative electrode terminal 54, and is thus chargeable and dischargeable. The circuit board 52 includes a controller 56, a switch 57, a positive temperature coefficient (PTC) device 58, and a temperature detector 59. However, the PTC device 58 may be omitted.

The controller 56 includes, for example, a central processing unit (CPU) and a memory, and controls an overall operation of the battery pack. The controller 56 detects and controls a use state of the electric power source 51 on an as-needed basis.

If a voltage of the electric power source 51 (the secondary battery) reaches an overcharge detection voltage or an overdischarge detection voltage, the controller 56 turns off the switch 57. This prevents a charging current from flowing into a current path of the electric power source 51. The overcharge detection voltage and the overdischarge detection voltage are not particularly limited. For example, the overcharge detection voltage is 4.2 V±0.05 V and the overdischarge detection voltage is 2.4 V±0.1 V.

The switch 57 includes, for example, a charge control switch, a discharge control switch, a charging diode, and a discharging diode. The switch 57 performs switching between coupling and decoupling between the electric power source 51 and external equipment in accordance with an instruction from the controller 56. The switch 57 includes, for example, a metal-oxide-semiconductor field-effect transistor (MOSFET). The charging and discharging currents are detected on the basis of an ON-resistance of the switch 57.

The temperature detector 59 includes a temperature detection device such as a thermistor. The temperature detector 59 measures a temperature of the electric power source 51 using the temperature detection terminal 55, and outputs a result of the temperature measurement to the controller 56. The result of the temperature measurement to be obtained by the temperature detector 59 is used, for example, in a case where the controller 56 performs charge/discharge control upon abnormal heat generation or in a case where the controller 56 performs a correction process upon calculating a remaining capacity.

EXAMPLES

A description is given of Examples of the present technology below according to an embodiment.

Examples 1 to 12 and Comparative Examples 1 to 11

Secondary batteries (lithium-ion secondary batteries) of the laminated-film type illustrated in FIGS. 1 and 2 were fabricated, following which the secondary batteries were each evaluated for performance as described below.
[Fabrication of Secondary Battery]
The secondary batteries were fabricated in accordance with the following procedure.
(Fabrication of Positive Electrode)
First, 98 parts by mass of the positive electrode active material ($LiNi_{0.86}Co_{0.10}Al_{0.03}Mn_{0.01}O_2$ (LNCAO) which is the lithium-nickel composite oxide (Li—Ni composite oxide) having the Ni proportion of 82%), 1 part by mass of the positive electrode binder (polyvinylidene difluoride), and 1 part by mass of the positive electrode conductor (carbon black) were mixed with each other to thereby obtain a positive electrode mixture. Thereafter, the positive electrode mixture was put into a solvent (N-methyl-2-pyrrolidone which is the organic solvent), following which the solvent was stirred to thereby prepare a paste positive electrode mixture slurry. Thereafter, the positive electrode mixture slurry was applied on the two opposed surfaces of the positive electrode current collector 21A (a band-shaped aluminum foil having a thickness of 12 μm) by means of a coating apparatus, following which the applied positive electrode mixture slurry was dried to thereby form the positive electrode active material layers 21B. Thereafter, the positive electrode active material layers 21B were compression-molded by means of a roll pressing machine to thereby obtain a positive electrode precursor. Lastly, the film 21C was formed on the surface of each of the positive electrode active material layers 21B in the stabilization treatment of the secondary battery to be described later. Thus, the positive electrode 21 was fabricated.

(Fabrication of Negative Electrode)

First, 98 parts by mass of the negative electrode active material ($Li_4Ti_5O_{12}$ (LTO) which is the lithium-titanium composite oxide (Li—Ti composite oxide)), 1 part by mass of the negative electrode binder (polyvinylidene difluoride), and 1 part by mass of the negative electrode conductor (carbon black) were mixed with each other to thereby obtain a negative electrode mixture. Thereafter, the negative electrode mixture was put into a solvent (N-methyl-2-pyrrolidone which is the organic solvent), following which the solvent was stirred to thereby prepare a paste negative electrode mixture slurry. Thereafter, the negative electrode mixture slurry was applied on the two opposed surfaces of the negative electrode current collector 22A (a band-shaped copper foil having a thickness of 15 μm) by means of a coating apparatus, following which the applied negative electrode mixture slurry was dried to thereby form the negative electrode active material layers 22B. Thereafter, the negative electrode active material layers 22B were compression-molded by means of a roll pressing machine to thereby obtain a negative electrode precursor. Lastly, the film 22C was formed on the surface of each of the negative electrode active material layers 22B in the stabilization treatment of the secondary battery to be described later. Thus, the negative electrode 22 was fabricated.

(Preparation of Electrolytic Solution)

The electrolyte salt (lithium hexafluorophosphate ($LiPF_6$)) was put into the solvent and the solvent was stirred, following which an additive (vinylene carbonate which is the unsaturated cyclic carbonic acid ester) was added to the solvent and the solvent was stirred. Used as the solvent was a mixture of: propylene carbonate (PC) which is the cyclic carbonic acid ester; and propyl propionate (PrPr), ethyl propionate (EtPr), propyl acetate (PrAc), or ethyl acetate (EtAc) which is the carboxylic acid ester. A mixture ratio (a weight ratio) of the solvent between the cyclic carbonic acid ester and the carboxylic acid ester was set to 30:70 (i.e., the content of the carboxylic acid ester in the solvent was set to 70 wt %). A content of the electrolyte salt was set to 1 mol/kg with respect to the solvent. A content of the unsaturated cyclic carbonic acid ester in the electrolytic solution was set to 1 wt %. Thus, the electrolyte salt was dispersed or dissolved in the solvent. As a result, the electrolytic solution was prepared.

For comparison, the electrolytic solution was prepared by a similar procedure except that a chain carbonic acid ester was used instead of the carboxylic acid ester. Used as the chain carbonic acid ester was dimethyl carbonate (DMC) or diethyl carbonate (DEC).

Further, for comparison, the electrolytic solution was prepared by a similar procedure except that, instead of the above-described carboxylic acid ester, another carboxylic acid ester (methyl propionate (MtPr)) was used.

(Assembly of Secondary Battery)

First, the positive electrode lead 31 including aluminum was welded to the positive electrode precursor (the positive electrode current collector 21A), and the negative electrode lead 32 including copper was welded to the negative electrode precursor (the negative electrode current collector 22A).

Thereafter, the positive electrode precursor and the negative electrode precursor were stacked on each other with the separator 23 (a fine-porous polyethylene film having a thickness of 15 μm) interposed therebetween, following which the stack of the positive electrode precursor, the negative electrode precursor, and the separator 23 was wound about the winding axis P to thereby fabricate the wound body. Thereafter, the wound body was pressed by means of a pressing machine, and was thereby shaped into an elongated shape.

Thereafter, the wound body was placed inside the depression part 10U of the outer package film 10. As the outer package film 10, an aluminum laminated film was used in which a fusion-bonding layer (a polypropylene film having a thickness of 30 μm), a metal layer (an aluminum foil having a thickness of 40 μm), and a surface protective layer (a nylon film having a thickness of 25 μm) were stacked in this order. Thereafter, the outer package film 10 was folded in such a manner as to have the fusion-bonding layer on the inner side and to sandwich the wound body, following which the outer edge parts of two sides of the outer package film 10 (the fusion-bonding layer) were thermal-fusion-bonded to each other to thereby allow the wound body to be contained inside the outer package film 10 having the pouch shape.

Lastly, the electrolytic solution was injected into the outer package film 10 having the pouch shape and thereafter, the outer edge parts of the remaining one side of the outer package film 10 (the fusion-bonding layer) were thermal-fusion-bonded to each other in a reduced-pressure environment. In this case, the sealing film 41 (a polypropylene film having a thickness of 5 μm) was interposed between the outer package film 10 and the positive electrode lead 31, and the sealing film 42 (a polypropylene film having a thickness of 5 μm) was interposed between the outer package film 10 and the negative electrode lead 32. The wound body was thereby impregnated with the electrolytic solution. Thus, the battery device 20 was fabricated. In this manner, the battery device 20 was sealed in the outer package film 10, and the secondary battery was thus assembled.

(Stabilization of Secondary Battery)

First, the secondary battery was charged in an ambient temperature environment (at a temperature of 23° C.). In this case, the secondary battery was charged with a constant current of 0.5 C until a voltage reached 2.7 V, i.e., until a state of charge (SOC) reached 100%. Thereafter, the secondary battery in the charged state was stored (for a storing period of 7 days) in a high-temperature environment (at a temperature of 40° C.). Lastly, the secondary battery was discharged in an ambient temperature environment (at a temperature of 23° C.). In this case, the secondary battery was discharged with a constant current of 0.2 C until the voltage reached 1.0 V. Note that 0.5 C is a value of a current that causes a battery capacity (a theoretical capacity) to be completely discharged in 2 hours, and 0.2 C is a value of a current that causes the battery capacity to be completely discharged in 5 hours.

In this manner: the film 21C was formed on the surface of each of the positive electrode active material layers 21B in the positive electrode precursor, and the positive electrode 21 was thus fabricated; and the film 22C was formed on the surface of each of the negative electrode active material layers 22B in the negative electrode precursor, and the negative electrode 22 was thus fabricated. As a result, the state of the secondary battery was electrochemically stabilized, and the secondary battery of the laminated-film type was thus completed.

In a case of fabricating the secondary battery, the positive electrode intensity ratio was varied by changing the environmental temperature at the time of charging in the stabilization treatment of the secondary battery described above, and the negative electrode intensity ratio was varied by changing the current at the time of charging in the stabilization treatment of the secondary battery described above.

After the secondary battery was completed, the secondary battery was disassembled to thereby collect the positive electrode 21, following which the surface analysis of the positive electrode 21 (the film 21C) was performed by XPS. On the basis of the results of the surface analysis of the positive electrode 21, the respective intensities of the two XPS spectra (the first oxygen spectrum and the second oxygen spectrum) were measured, following which the positive electrode intensity ratio was calculated on the basis of the measurement results. The calculation results of the positive electrode intensity ratio were as indicated in Table 1.

Further, the respective intensities of the two XPS spectra (the third oxygen spectrum and the fourth oxygen spectrum) were measured by a similar procedure except that the surface analysis of the negative electrode 22 was performed instead of the surface analysis of the positive electrode 21, following which the negative electrode intensity ratio was calculated on the basis of the measurement results. The calculation results of the negative electrode intensity ratio were as indicated in Table 1.

Evaluation of the secondary batteries for their performance (the swelling characteristic, the cyclability characteristic, and the load characteristic) revealed the results presented in Tables 1 and 2.

(Swelling Characteristic)

First, the secondary battery was charged in an ambient temperature environment (at a temperature of 23° C.), following which a thickness (a pre-storage thickness) of the secondary battery was measured. In this case, the secondary battery was charged with a constant current of 0.5 C until a voltage reached 2.7 V, and was thereafter charged with the constant voltage of 2.7 V until a current reached 0.01 C. Note that 0.01 C is a value of a current that causes the battery capacity to be completely discharged in 100 hours. Thereafter, the secondary battery in the charged state was stored (for a storing period of 1 month) in a high-temperature environment (at a temperature of 60° C.), following which the thickness (a post-storage thickness) of the secondary battery was measured again. Lastly, the following was calculated:

swelling rate (%)=[(post-storage thickness−pre-storage thickness)/pre-storage thickness]×100.

(Cyclability Characteristic)

First, the secondary battery was charged and discharged for one cycle in an ambient temperature environment (at a temperature of 23° C.) to thereby measure a discharge capacity (a first-cycle discharge capacity). In this case, the secondary battery was charged with a constant current of 0.5 C until a voltage reached 2.7 V, and was thereafter charged with the constant voltage of 2.7 V until a current reached 0.01 C. Further, the secondary battery was discharged with a constant current of 0.5 C until the voltage reached 1.0 V.

Thereafter, the secondary battery was repeatedly charged and discharged in a high-temperature environment (at a temperature of 50° C.) until the total number of cycles reached 100 to thereby measure the discharge capacity (a 100th-cycle discharge capacity). Charging and discharging conditions were similar to those at the first cycle except that the current at the time of charging was changed to 6.0 C and the current at the time of discharging was changed to 2.0 C. Note that 6.0 C is a value of a current that causes the battery capacity to be completely discharged in ⅙ hours, and 2.0 C is a value of a current that causes the battery capacity to be completely discharged in 0.5 hours.

Lastly, the following was calculated: cycle retention rate (%)=(100th-cycle discharge capacity/first-cycle discharge capacity)×100.

(Load Characteristic)

First, the secondary battery was charged and discharged for one cycle in an ambient temperature environment (at a temperature of 23° C.) to thereby measure a discharge capacity (a first-cycle discharge capacity). In this case, the secondary battery was charged with a constant current of 0.5 C until a voltage reached 2.7 V, and was thereafter charged with the constant voltage of 2.7 V until a current reached 0.01 C. Further, the secondary battery was discharged with a constant current of 1.0 C until the voltage reached 1.0 V. Note that 1.0 C is a value of a current that causes the battery capacity to be completely discharged in 1 hour.

Thereafter, the secondary battery was further charged and discharged for one cycle in the same environment to thereby measure the discharge capacity (a second-cycle discharge capacity). Charging and discharging conditions were similar to those at the first cycle except that the current at the time of discharging was changed to 6.0 C.

Lastly, the following was calculated: load retention rate (%)=(second-cycle discharge capacity (current at time of discharging=6.0 C)/first-cycle discharge capacity (current at time of discharging=1.0 C))×100.

TABLE 1

| | Positive electrode | | | Negative electrode | | Electrolytic solution | | | | | |
|---|---|---|---|---|---|---|---|---|---|---|---|
| | Li—Ni composite oxide | Ni proportion (%) | Positive electrode intensity ratio | Li—Ti composite oxide | Negative electrode intensity ratio | Cyclic carbonic acid ester | Carboxylic acid ester | Content (wt %) | Swelling rate (%) | Cycle retention rate (%) | Load retention rate (%) |
| Comparative example 1 | LNCAMO | 82 | 0.21 | LTO | 1.09 | PC | PrPr | 70 | 1.8 | 85.2 | 82.1 |
| Comparative example 2 | | | 0.28 | | 1.06 | | | | 1.2 | 89.1 | 85.2 |
| Example 1 | | | 0.30 | | 1.03 | | | | 0.8 | 92.1 | 88.2 |
| Example 2 | | | 0.44 | | 1.04 | | | | 0.6 | 92.5 | 88.5 |
| Example 3 | | | 0.56 | | 1.02 | | | | 0.7 | 94.0 | 88.8 |

TABLE 1-continued

| | Positive electrode | | | Negative electrode | | Electrolytic solution | | | | | |
|---|---|---|---|---|---|---|---|---|---|---|---|
| | Li—Ni composite oxide | Ni proportion (%) | Positive electrode intensity ratio | Li—Ti composite oxide | Negative electrode intensity ratio | Cyclic carbonic acid ester | Carboxylic acid ester | Content (wt %) | Swelling rate (%) | Cycle retention rate (%) | Load retention rate (%) |
| Example 4 | | | 0.67 | | 1.06 | | | | 0.7 | 93.6 | 90.0 |
| Example 5 | | | 0.80 | | 1.12 | | | | 1.4 | 93.1 | 90.2 |
| Comparative example 3 | | | 0.83 | | 1.11 | | | | 7.2 | 88.1 | 90.1 |
| Comparative example 4 | | | 0.95 | | 1.20 | | | | 12.0 | 85.3 | 88.8 |
| Comparative example 5 | | | 1.10 | | 1.23 | | | | 25.0 | 80.1 | 89.0 |
| Example 6 | | | 0.62 | | 1.01 | | EtPr | | 2.4 | 94.0 | 92.1 |
| Example 7 | | | 0.55 | | 1.03 | | PrAc | | 2.7 | 94.2 | 91.2 |
| Example 8 | | | 0.51 | | 1.06 | | EtAc | | 3.2 | 93.8 | 89.0 |

TABLE 2

| | Positive electrode | | | Negative electrode | | Electrolytic solution | | | | | |
|---|---|---|---|---|---|---|---|---|---|---|---|
| | Li—Ni composite oxide | Ni proportion (%) | Positive electrode intensity ratio | Li—Ti composite oxide | Negative electrode intensity ratio | Cyclic carbonic acid ester | Carboxylic acid ester | Content (wt %) | Swelling rate (%) | Cycle retention rate (%) | Load retention rate (%) |
| Comparative example 6 | LNCAMO | 82 | 0.68 | LTO | 0.75 | PC | PrPr | 70 | 0.7 | 92.1 | 78.3 |
| Example 9 | | | 0.72 | | 0.82 | | | | 0.9 | 92.5 | 89.9 |
| Example 10 | | | 0.68 | | 0.95 | | | | 0.6 | 93.2 | 89.8 |
| Example 11 | | | 0.67 | | 1.06 | | | | 0.7 | 93.6 | 90.0 |
| Example 12 | | | 0.65 | | 1.35 | | | | 1.5 | 93.0 | 90.1 |
| Comparative example 7 | | | 0.71 | | 1.42 | | | | 5.8 | 88.2 | 89.9 |
| Comparative example 8 | | | 0.75 | | 1.65 | | | | 6.6 | 87.7 | 90.4 |
| Comparative example 9 | LNCAMO | 82 | 0.76 | LTO | 1.13 | PC | DMC | 70 | 28.8 | 91.1 | 93.4 |
| Comparative example 10 | | | 0.68 | | 1.12 | | DEC | | 18.2 | 91.4 | 92.9 |
| Comparative example 11 | | | 0.60 | | 1.02 | | MtPr | | 16.1 | 92.4 | 92.5 |

As indicated in Tables 1 and 2, in a case where the positive electrode 21 included the lithium-nickel composite oxide, the negative electrode 22 included the lithium-titanium composite oxide, and the electrolytic solution included the carboxylic acid ester (Examples 1 to 5 and 9 to 12, and Comparative examples 1 to 8), the swelling rate, the cycle retention rate, and the load retention rate each varied depending on the positive electrode intensity ratio and the negative electrode intensity ratio.

Specifically, in a case where an appropriate condition of the positive electrode intensity ratio being within the range from 0.30 to 0.80 both inclusive was not satisfied (Comparative examples 1 to 5), a trade-off relationship was exhibited in which improvement of any of the swelling rate, the cycle retention rate, and the load retention rate caused degradation of the others. Thus, not all of the swelling rate, the cycle retention rate, and the load retention rate was improved.

Further, in a case where an appropriate condition of the negative electrode intensity ratio being within the range from 0.82 to 1.35 both inclusive was not satisfied (Comparative examples 6 to 8), the trade-off relationship was also exhibited. Thus, not all of the swelling rate, the cycle retention rate, and the load retention rate was improved.

In contrast, in a case where the above-described appropriate condition regarding the positive electrode intensity ratio was satisfied and the above-described appropriate condition regarding the negative electrode intensity ratio was satisfied (Examples 1 to 5 and 9 to 12), the above-described trade-off relationship was overcome, which allowed for improvement of all of the swelling rate, the cycle retention rate, and the load retention rate.

In particular, in the case where the appropriate conditions regarding the positive electrode intensity ratio and the negative electrode intensity ratio were satisfied (Examples 6 to 8), similar results were obtained even if the carboxylic acid ester was changed in kind.

Note that, in a case where the electrolytic solution included the chain carbonic acid ester instead of the carboxylic acid ester (Comparative examples 9 and 10), the above-described trade-off relationship was exhibited. Thus, not all of the swelling rate, the cycle retention rate, and the load retention rate was improved.

Further, in a case where the electrolytic solution included the other carboxylic acid ester (Comparative example 11), a tendency similar to that of the case where the electrolytic solution included the chain carbonic acid ester (Comparative examples 9 and 10) was obtained. Thus, not all of the swelling rate, the cycle retention rate, and the load retention rate was improved.

Examples 13 to 18

As indicated in Table 3, the secondary batteries were fabricated by a similar procedure except that the Ni proportion was changed, and the performance (the swelling characteristic, the cyclability characteristic, and the load characteristic) of the secondary batteries were evaluated. Here, a battery capacity (Ah) was additionally measured as the performance of the secondary battery.

with a case where the content of the carboxylic acid ester was less than 50 wt % (Example 19). In this case, the swelling rate was markedly suppressed if the content of the carboxylic acid ester was less than or equal to 80 wt % (Examples 4, 20, and 21) in particular.

Based upon the results presented in Tables 1 to 4, the swelling rate decreased, and the cycle retention rate and the load retention rate each increased if: the positive electrode 21 included the lithium-nickel composite oxide; the negative electrode 22 included the lithium-titanium composite oxide; the electrolytic solution included the carboxylic acid ester such as ethyl acetate; the result of the surface analysis of the positive electrode 21 obtained by XPS, i.e., the positive electrode intensity ratio, satisfied the appropriate condition (the positive electrode intensity ratio was within the range from 0.30 to 0.80 both inclusive); and the result of the surface analysis of the negative electrode 22 obtained by

TABLE 3

| | Positive electrode | | | Negative electrode | | Electrolytic solution | | | | | Cycle retention rate (%) | Load retention rate (%) |
|---|---|---|---|---|---|---|---|---|---|---|---|---|
| | Li—Ni composite oxide | Ni proportion (%) | Positive electrode intensity ratio | Li—Ti composite oxide | Negative electrode intensity ratio | Cyclic carbonic acid ester | Carboxylic acid ester | Content (wt %) | Battery capacity (Ah) | Swelling rate (%) | | |
| Example 13 | LNCAMO | 50 | 0.65 | LTO | 1.04 | PC | PrPr | 70 | 8.0 | 0.7 | 94.5 | 90.4 |
| Example 14 | | 60 | 0.68 | | 1.05 | | | | 8.8 | 0.8 | 94.6 | 90.1 |
| Example 15 | | 80 | 0.67 | | 1.07 | | | | 9.9 | 0.6 | 94.1 | 90.5 |
| Example 4 | | 82 | 0.67 | | 1.06 | | | | 10.0 | 0.7 | 93.6 | 90.0 |
| Example 16 | | 86 | 0.70 | | 1.08 | | | | 10.2 | 0.9 | 92.5 | 88.9 |
| Example 17 | | 90 | 0.71 | | 1.11 | | | | 10.3 | 1.1 | 85.1 | 87.5 |
| Example 18 | | 93 | 0.69 | | 1.20 | | | | 10.4 | 1.3 | 80.9 | 85.8 |

As indicated in Table 3, in a case where the Ni proportion was greater than or equal to 80% (Examples 4 and 15 to 18), a low swelling rate, a high cycle retention rate, and a high load retention rate were achieved and the battery capacity increased as compared with a case where the Ni proportion was less than 80% (Examples 13 and 14).

Examples 19 to 22

As indicated in Table 4, the secondary batteries were fabricated by a similar procedure except that the content of the carboxylic acid ester in the solvent was changed, and the performance (the swelling characteristic, the cyclability characteristic, and the load characteristic) of the secondary batteries were evaluated.

XPS, i.e., the negative electrode intensity ratio, satisfied the appropriate condition (the negative electrode intensity ratio was within the range from 0.82 to 1.35 both inclusive). Accordingly, the secondary battery was improved in all of the swelling rate, the cycle retention rate, and the load retention rate, and therefore achieved a superior swelling characteristic, a superior cyclability characteristic, and a superior load characteristic.

Although the present technology has been described above with reference to one or embodiments including Examples, the configuration of the present technology is not limited thereto, and is therefore modifiable in a variety of suitable ways.

Specifically, although the description has been given of the case where the secondary battery has a battery structure

TABLE 4

| | Positive electrode | | | Negative electrode | | Electrolytic solution | | | Swelling rate (%) | Cycle retention rate (%) | Load retention rate (%) |
|---|---|---|---|---|---|---|---|---|---|---|---|
| | Li—Ni composite oxide | Ni proportion (%) | Positive electrode intensity ratio | Li—Ti composite oxide | Negative electrode intensity ratio | Cyclic carbonic acid ester | Carboxylic acid ester | Content (wt %) | | | |
| Example 19 | LNCAMO | 82 | 0.66 | LTO | 1.09 | PC | PrPr | 40 | 0.8 | 91.5 | 81.3 |
| Example 20 | | | 0.67 | | 1.07 | | | 50 | 0.7 | 93.2 | 88.5 |
| Example 4 | | | 0.67 | | 1.06 | | | 70 | 0.7 | 93.6 | 90.0 |
| Example 21 | | | 0.68 | | 1.02 | | | 80 | 0.9 | 93.2 | 90.1 |
| Example 22 | | | 0.71 | | 0.99 | | | 90 | 2.3 | 92.1 | 86.1 |

As indicated in Table 4, in a case where the content of the carboxylic acid ester was greater than or equal to 50 wt % (Examples 4 and 20 to 22), the cycle retention rate and the load retention rate each further increased while the swelling rate was suppressed within an allowable range, as compared of the laminated-film type, the battery structure is not particularly limited, and may thus be of any other type, such as a cylindrical type, a prismatic type, a coin type, or a button type.

Further, although the description has been given of the case where the battery device has a device structure of a wound type, the device structure of the battery device is not particularly limited, and may thus be of any other type, such as a stacked type or a zigzag folded type. In the stacked type, the electrodes (the positive electrode and the negative electrode) are stacked, and in the zigzag folded type, the electrodes (the positive electrode and the negative electrode) are folded in a zigzag manner.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode including a lithium-nickel composite oxide;
a negative electrode including a lithium-titanium composite oxide; and
an electrolytic solution including a carboxylic acid ester, wherein
the carboxylic acid ester includes at least one of ethyl acetate, propyl acetate, ethyl propionate, or propyl propionate,
a first oxygen spectrum and a second oxygen spectrum are detectable by a surface analysis of the positive electrode by X-ray photoelectron spectroscopy, the first oxygen spectrum having a peak within a range of binding energy that is greater than or equal to 528 electron volts and less than or equal to 531 electron volts, the second oxygen spectrum having a peak within a range of binding energy that is greater than 531 electron volts and less than or equal to 535 electron volts,
a ratio of an intensity of the first oxygen spectrum to an intensity of the second oxygen spectrum is greater than or equal to 0.30 and less than or equal to 0.80,
a third oxygen spectrum and a fourth oxygen spectrum are detectable by a surface analysis of the negative electrode by the X-ray photoelectron spectroscopy, the third oxygen spectrum having a peak within a range of binding energy that is greater than or equal to 528 electron volts and less than or equal to 531 electron volts, the fourth oxygen spectrum having a peak within a range of binding energy that is greater than 531 electron volts and less than or equal to 535 electron volts, and
a ratio of an intensity of the third oxygen spectrum to an intensity of the fourth oxygen spectrum is greater than or equal to 0.82 and less than or equal to 1.35.

2. The secondary battery according to claim 1, wherein the lithium-nickel composite oxide includes a compound represented by Formula (1) below, $$Li_xNi_{(1-y)}M1_yO_2 \tag{1}$$

where
M1 is at least one of elements belonging to groups 2 to 15 in a long period periodic table of elements excluding Ni, and
x and y satisfy $0.8 \leq x \leq 1.2$ and $0 \leq y < 1.0$.

3. The secondary battery according to claim 2, wherein a proportion of a number of moles of Ni to a sum of the number of moles of Ni and a number of moles of M1 is greater than or equal to 80 percent.

4. The secondary battery according to claim 1, wherein
the electrolytic solution includes a solvent and an electrolyte salt,
the solvent includes the carboxylic acid ester, and
a content of the carboxylic acid ester in the solvent is greater than or equal to 50 weight percent and less than or equal to 90 weight percent.

5. The secondary battery according to claim 4, wherein the solvent further includes a cyclic carbonic acid ester.

6. The secondary battery according to claim 1, wherein the positive electrode includes
a positive electrode active material layer including the lithium-nickel composite oxide, and
a positive electrode film provided on a surface of the positive electrode active material layer, the positive electrode film including oxygen as a constituent element, and
the surface analysis of the positive electrode by the X-ray photoelectron spectroscopy comprises an analysis of the positive electrode film.

7. The secondary battery according to claim 1, wherein the lithium-titanium composite oxide includes at least one of respective compounds represented by Formula (2), Formula (3), and Formula (4) below, $$Li[Li_xM2_{(1-3x)/2}Ti_{(3+x)/2}]O_4 \tag{2}$$

where
M2 is at least one of Mg, Ca, Cu, Zn, or Sr, and
x satisfies $0 \leq x \leq 1/3$, $$Li[Li_yM3_{1-3y}Ti_{1+2y}]O_4 \tag{3}$$

where
M3 is at least one of Al, Sc, Cr, Mn, Fe, Ga, or Y, and
y satisfies $0 \leq y \leq 1/3$, $$Li[Li_{1/3}M4_zTi_{(5/3)-z}]O_4 \tag{4}$$

where
M4 is at least one of V, Zr, or Nb, and
z satisfies $0 \leq z \leq 2/3$.

8. The secondary battery according to claim 1, wherein the negative electrode includes
a negative electrode active material layer including the lithium-titanium composite oxide, and
a negative electrode film provided on a surface of the negative electrode active material layer, the negative electrode film including oxygen as a constituent element, and
the surface analysis of the negative electrode by the X-ray photoelectron spectroscopy comprises an analysis of the negative electrode film.

9. The secondary battery according to claim 1, further comprising an outer package member having flexibility and containing the positive electrode, the negative electrode, and the electrolytic solution.

10. The secondary battery according to claim 1, wherein the secondary battery comprises a lithium-ion secondary battery.

\* \* \* \* \*